US006503564B1

(12) United States Patent
Fleming et al.

(10) Patent No.: US 6,503,564 B1
(45) Date of Patent: Jan. 7, 2003

(54) METHOD OF COATING MICROSTRUCTURED SUBSTRATES WITH POLYMERIC LAYER(S), ALLOWING PRESERVATION OF SURFACE FEATURE PROFILE

(75) Inventors: Robert J. Fleming; Joseph M. McGrath, both of Lake Elmo; Christopher S. Lyons, St. Paul, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/259,487

(22) Filed: Feb. 26, 1999

(51) Int. Cl.[7] .............................. B05D 3/02; C08J 7/16

(52) U.S. Cl. .................... 427/255.6; 427/487; 427/488; 427/384

(58) Field of Search .......................... 427/255.6, 374.6, 427/379, 385.5, 487, 488, 384

(56) References Cited

U.S. PATENT DOCUMENTS

| | | | | |
|---|---|---|---|---|
| 3,132,046 A | | 5/1964 | Mann | |
| 3,392,051 A | | 7/1968 | Caswell et al. | |
| 3,547,683 A | | 12/1970 | Williams et al. | |
| 3,700,305 A | | 10/1972 | Bingham | |
| 3,700,478 A | | 10/1972 | Bingham | |
| 3,729,814 A | | 5/1973 | Wright et al. | |
| 3,895,135 A | * | 7/1975 | Hofer | 427/250 |
| 4,127,682 A | * | 11/1978 | Laurin | 427/164 |
| 4,138,509 A | * | 2/1979 | Ingle et al. | 427/255.17 |

(List continued on next page.)

FOREIGN PATENT DOCUMENTS

| | | |
|---|---|---|
| EP | 147 696 | 7/1985 |
| EP | 339 844 | 11/1989 |
| JP | 6-347622 | 12/1994 |
| WO | WO 96/31571 | 10/1996 |
| WO | WO 97/01439 | 1/1997 |
| WO | WO 97/37844 | 10/1997 |
| WO | WO 98/18852 | 5/1998 |
| WO | WO 98/50805 | 11/1998 |
| WO | WO 99/16931 | 4/1999 |
| WO | WO 00/35605 | 6/2000 |

OTHER PUBLICATIONS

John Affinito et al, "Vacum deposited polymer/metal multilayer films for optical application," *Thin Solid Films*, (276) 1995, pp. 43–48.

Michael R. Chamberlain, "Optically variable devices and security printing, (part of a paper presented at Holopack Holoprint '95, New Orleans)" *Management and technology*, Dec. 1995, pp. 12–15.

J. A. Dobrowolski, F. C. Ho, and A. Waldorf, Research on thin film anticounterfeiting coatings at the National Research Council of Canada, *Applied Optics*, vol. 28, No. 14; Jul. 15, 1989; pp. 2702–2717.

J. D. Affinito et al., Polymer/Polymer/Polymer/Oxide, and Polymer/Metal Vacuum Deposited Interference Filters, Pr. of 10$^{th}$ Intl. Conference on Vacuum Web Coating, 1996, pp. 207–220.

Thin Films (Film Formation Techniques), *Kirk–Othmer Encyclopedia of Chemical Technology*, Fourth Edition, vol. 23, John Wiley & Sons, 1997, pp. 1040–1076.

*Primary Examiner*—Bret Chen
(74) *Attorney, Agent, or Firm*—Robert J. Pechman

(57) ABSTRACT

A method of making a polymer coating on a microstructured substrate. The method may be performed by vaporizing a liquid monomer or other pre-polymer composition and condensing the vaporized material onto a microstructured substrate, followed by curing. The resulting article may possess a coating that preserves the underlying microstructural feature profile. Such a profile-preserving polymer coating can be used to change or enhance the surface properties of the microstructured substrate while maintaining the function of the structure.

19 Claims, 5 Drawing Sheets

U.S. PATENT DOCUMENTS

| | | | | | |
|---|---|---|---|---|---|
| 4,243,705 | A | * | 1/1981 | Yapp et al. | 427/387 |
| 4,310,584 | A | | 1/1982 | Cooper et al. | |
| 4,543,275 | A | | 9/1985 | Akashi et al. | |
| 4,648,932 | A | | 3/1987 | Bailey | |
| 4,696,719 | A | | 9/1987 | Bischoff | |
| 4,722,515 | A | | 2/1988 | Ham | |
| 4,763,985 | A | | 8/1988 | Bingham | |
| 4,842,893 | A | | 6/1989 | Yializis et al. | |
| 4,856,857 | A | | 8/1989 | Takeuchi et al. | |
| 4,954,371 | A | | 9/1990 | Yializis | |
| 5,018,048 | A | * | 5/1991 | Shaw et al. | 361/323 |
| 5,030,699 | A | * | 7/1991 | Motoyama et al. | 525/477 |
| 5,032,461 | A | | 7/1991 | Shaw et al. | |
| 5,051,298 | A | * | 9/1991 | Landry et al. | 428/220 |
| 5,097,800 | A | | 3/1992 | Shaw et al. | |
| 5,116,460 | A | | 5/1992 | Bukhman | |
| 5,125,138 | A | | 6/1992 | Shaw et al. | |
| 5,260,095 | A | | 11/1993 | Affinito | |
| 5,266,671 | A | | 11/1993 | Primeaux, II | |
| 5,278,694 | A | | 1/1994 | Wheatley et al. | |
| 5,339,198 | A | | 8/1994 | Wheatly et al. | |
| 5,342,477 | A | | 8/1994 | Cathey | |
| 5,395,644 | A | | 3/1995 | Affinito | |
| 5,440,446 | A | | 8/1995 | Shaw et al. | |
| 5,454,919 | A | | 10/1995 | Hill et al. | |
| 5,506,008 | A | | 4/1996 | Klumpp et al. | |
| 5,559,634 | A | | 9/1996 | Weber | |
| 5,672,097 | A | | 9/1997 | Hoopman | |
| 5,674,592 | A | | 10/1997 | Clark et al. | |
| 5,743,981 | A | | 4/1998 | Lu | |
| 5,812,317 | A | | 9/1998 | Billingsley et al. | |
| 5,877,895 | A | | 3/1999 | Shaw et al. | |
| 5,879,828 | A | | 3/1999 | Debe et al. | |
| 6,224,948 | B1 | | 5/2001 | Affinito | |
| 6,228,434 | B1 | * | 5/2001 | Affinito | 427/488 |

* cited by examiner

METHOD OF COATING MICROSTRUCTURED SUBSTRATES WITH POLYMERIC LAYER(S), ALLOWING PRESERVATION OF SURFACE FEATURE PROFILE

The present invention pertains to (i) a method of making an article that has a polymer coating disposed on a microstructured substrate, and to (ii) an article that possesses a microstructured surface and that has a profile-preserving polymer coating disposed on the surface.

BACKGROUND

Various techniques are known for coating substrates with thin layers of polymeric materials. In general, the known techniques can be predominantly divided into three groups, (1) liquid coating methods, (2) gas-phase coating methods, and (3) monomer vapor coating methods. As discussed below, some of these methods have been used to coat articles that have very small surface feature profiles.

Liquid Coating Methods

Liquid coating methods generally involve applying a solution or dispersion of a polymer onto a substrate or involve applying a liquid reactive material onto the substrate. Polymer or pre-polymer application is generally followed by evaporating the solvent (in the case of materials applied from a solution or dispersion) and/or hardening or curing to form a polymer coating. Liquid coating methods include the techniques commonly known as knife, bar, slot, slide, die, roll, or gravure coating. Coating quality generally depends on mixture uniformity, the quality of the deposited liquid layer, and the process used to dry or cure the liquid layer. If a solvent is used, it can be evaporated from the mixture to form a solid coating. The evaporation step, however, commonly requires significant energy and process time to ensure that the solvent is disposed of in an environmentally-sound manner. During the evaporation step, localized factors—which include viscosity, surface tension, compositional uniformity, and diffusion coefficients—can affect the quality of the final polymer coating.

Liquid coating techniques can be used to coat materials onto substrates that have small surface feature profiles. For example, U.S. Pat. No. 5,812,317 discloses applying a solution of prepolymer components and a silane coupling agent onto the protruding portions of partially embedded microspheres. And U.S. Pat. No. 4,648,932 discloses extruding a liquid resin onto partially embedded microspheres. As another example, U.S. Pat. No. 5,674,592 discloses forming a self-assembled-monolayer coating of octadecyl mercaptan and a partially fluorinated mercaptan (namely, $C_8F_{17}(CH_2)_{11}SH$) from a solvent onto a surface that has small surface feature profiles.

Gas-phase Coating Methods

Gas-phase coating techniques generally include the methods commonly known as physical vapor deposition (PVD), chemical vapor deposition (CVD), and plasma deposition. These techniques commonly involve generating a gas-phase coating material that condenses onto or reacts with a substrate surface. The methods are typically suitable for coating films, foils, and papers in roll form, as well as coating three-dimensional objects. Various gas-phase deposition methods are described in “Thin Films: Film Formation Techniques,” *Encyclopedia of Chemical Technology*, 4th ed., vol. 23 (New York, 1997), pp. 1040–76.

PVD is a vacuum process where the coating material is vaporized by evaporation, by sublimation, or by bombardment with energetic ions from a plasma (sputtering). The vaporized material condenses to form a solid film on the substrate. The deposited material, however, is generally metallic or ceramic in nature (see *Encyclopedia of Chemical Technology* as cited above). U.S. Pat. No. 5,342,477 discloses using a PVD process to deposit a metal on a substrate that has small surface feature profiles. A PVD process has also been used to sublimate and deposit organic materials such as perylene dye molecules onto substrates that have small surface features, as disclosed in U.S. Pat. No. 5,879,828.

CVD processes involve reacting two or more gas-phase species (precursors) to form solid metallic and/or ceramic coatings on a surface (see *Encyclopedia of Chemical Technology* as cited above). In a high-temperature CVD method, the reactions occur on surfaces that can be heated at 300° C. to 1000° C. or more, and thus the substrates are limited to materials that can withstand relatively high temperatures. In a plasma-enhanced CVD method, the reactions are activated by a plasma, and therefore the substrate temperature can be significantly lower. CVD processing can be used to form inorganic coatings on structured surfaces. For example, U.S. Pat. No. 5,559,634 teaches the use of CVD processing to form thin, transparent coatings of ceramic materials on structured surfaces for optical applications.

Plasma deposition, also known as plasma polymerization, is analogous to plasma-enhanced CVD, except that the precursor materials and the deposited coatings are typically organic in nature. The plasma significantly breaks up the precursor molecules into a distribution of molecular fragments and atoms that randomly recombine on a surface to generate a solid coating (see *Encyclopedia of Chemical Technology* as cited above). A characteristic of a plasma-deposited coating is the presence of a wide range of functional groups, including many types of functional groups not contained in the precursor molecules. Plasma-deposited coatings generally lack the repeat-unit structure of conventional polymers, and they generally do not resemble linear, branched, or conventional crosslinked polymers and copolymers. Plasma deposition techniques can be used to coat structured surfaces. For example, U.S. Pat. No. 5,116,460 teaches the use of plasma deposition to form coatings of plasma-polymerized fluorocarbon gases onto etched silicon dioxide surfaces during semiconductor device fabrication.

Monomer Vapor Coating Methods

Monomer vapor coating methods may be described as a hybrid of the liquid and gas phase coating methods. Monomer vapor coating methods generally involve condensing a liquid coating out of a gas-phase and subsequently solidifying or curing it on the substrate. The liquid coating generally can be deposited with high uniformity and can be quickly polymerized to form a high quality solid coating. The coating material is often comprised of radiation-curable monomers. Electron-beam or ultraviolet irradiation is frequently used in the curing (see, for example, U.S. Pat. No. 5,395,644). The liquid nature of the initial deposit makes monomer vapor coatings generally smoother than the substrate. These coatings therefore can be used as a smoothing layer to reduce the roughness of a substrate (see, for example, J. D. Affinito et al., “Polymer/Polymer, Polymer/Oxide, and Polymer/Metal Vacuum Deposited Interference Filters”, *Proceedings of the* $10^{th}$ *International Conference on Vacuum Web Coating*, pp. 207–20 (1996)).

SUMMARY OF THE INVENTION

As described above, current technology allows coatings to be produced which have metal, ceramic, organic molecule, or plasma-polymerized layers. While the known technology enables certain coatings to be applied onto certain substrates, the methods are generally limited in the scope of materials that can be deposited and in the controllability of the chemical composition of the coatings. Indeed, these methods are generally not known to be suitable for producing cured polymeric coatings on microstructured surfaces that have controlled chemistry and/or that preserve the microstructured profile. While the techniques described above are generally suitable for coating flat surfaces, or substrates having macroscopic contours, they are not particularly suited for coating substrates that have microstructured profiles because of their inability to maintain the physical microstructure.

Some substrates have a specific surface microstructure rather than a smooth, flat surface. Microstructured surfaces are commonly employed to provide certain useful properties to the substrate, such as optical, mechanical, physical, biological, or electrical properties. In many situations, it is desirable to coat the microstructured surface to modify the substrate properties while retaining the benefits of the underlying microstructured surface profile. Such coatings therefore are generally thin relative to the characteristic microstructured surface dimensions. Of the thin-film coating methods described above, few are capable of depositing uniform thin coatings onto microstructured surfaces in a manner that retains the underlying physical microstructured surface profile.

The present invention provides a new method of coating a microstructured surface with a polymer. The method comprises the steps: (a) condensing a vaporized liquid composition containing a monomer or pre-polymer onto a microstructured surface to form a curable precursor coating; and (b) curing the precursor coating on the microstructured surface.

This method differs from known methods of coating microstructured surfaces in that a vaporized liquid composition is condensed onto a microstructured surface to provide a curable coating that is cured on the microstructured surface. The method is capable of producing polymeric coatings that preserve the microstructured profile of the underlying substrate. Known methods of coating microstructured articles involved coating reactive liquid materials from a solution or dispersion, sublimating whole molecules, or depositing atoms and/or molecular fragments. These known techniques were not known to provide polymer coatings that preserved the profile of the underlying microstructured substrate and that had controlled chemical composition.

A product that can be produced from the inventive method thus is different from known microstructured articles. The present invention accordingly also provides an article that has a microstructured surface that has a profile-preserving polymer coating disposed on the microstructured surface. The polymer coating not only preserves the profile of the microstructured surface, but it also controls the chemical composition. Thus, the polymer coating also has a controlled chemical composition. In an alternative embodiment, a microstructured substrate can be coated such that it has multiple profile-preserving coatings to form a multilayer coating.

The present invention provides the ability to coat a wide range of polymer-forming materials on microstructured surfaces to yield coatings that maintain the microstructured profile and that have controlled chemical compositions. This in turn allows the surface properties of the microstructured substrate to be changed (i.e., be replaced or enhanced with the surface properties of the coating) without adversely affecting the structural properties of the original surface. Additionally, multiple profile-preserving coatings of the same or different materials can be deposited to further affect one or more surface properties, such as optical properties, electrical properties, release properties, biological properties, and other such properties, without adversely affecting the profile of the microstructured substrate.

Desired fabrication techniques as well as end use applications can limit the range of materials that can be used to form microstructured substrates. Thus, while microstructured articles can be readily made to yield desired microstructural properties, the surface of the microstructured article might have undesirable (or less than optimal) physical, chemical, electrical, optical, biological properties, or other surface properties.

The present invention can provide microstructured substrates with a wide variety of surface properties that might not otherwise be attainable by conventional means while still maintaining the microstructured profile of the substrate. By depositing a profile-preserving polymer coating on a microstructured surface according to the present invention, the structural properties of the microstructured substrate can be maintained while changing or enhancing one or more of various physical, optical, or chemical properties of the microstructured surface. The profile-preserving polymer coatings of the present invention also have a controlled chemical composition, which helps achieve and maintain surface property uniformity across desired substrate areas.

The above and other advantages of the invention are more fully shown and described in the drawings and detailed description of this invention. It is to be understood, however, that the description and drawings are for illustrative purposes and should not be read in a manner that would unduly limit the scope of the invention.

Glossary

As used in this document, the following terms have the following definitions:

"Condensing" means collecting gas-phase material on a surface so that the material resides in a liquid or solid state on the surface.

"Controlled chemical composition" defines a polymer coating that has a predetermined local chemical composition characterized by monomer units joined, for example, by addition, condensation, and/or ring-opening reactions, and whose chemical composition is predetermined over lateral distances equaling at least several multiples of the average coating thickness, where the following meanings are ascribed: "predetermined" means capable of being known before making the coating; "lateral" is defined by all directions perpendicular to the thickness direction; and the "thickness direction" is defined for any given position on the coating as the direction perpendicular to the underlying surface profile at that position.

"Curing" means a process of inducing the linking of monomer and/or oligomer units to form a polymer.

"Feature", when used to describe a surface, means a structure such as a post, rib, peak, portion of a microsphere, or other such protuberance that rises above adjacent portions of the surface, or a structure such as a groove, channel, valley, well, notch, hole, or other such indentation that dips below adjacent portions of the surface. The "size" or "dimension" of a feature includes its characteristic width, depth, height, or length. Of the various dimensions in a microstructured surface profile, the "smallest characteristic dimension of interest" indicates the smallest dimension of the microstructured profile that is to be preserved by a profile-preserving polymer coating according to the present invention.

"Microstructured substrate" means a substrate that has at least one surface that has an intended plurality of features that define a profile characterized by local minima and maxima, the separation between neighboring local minima and/or maxima being about 1 micrometer ($\mu$m) to about 1000 $\mu$m. The separation between two points on the surface refers to the distance between the points in any direction of interest.

"Monomer" refers to a single, one unit molecule that is capable of combining with itself or with other monomers or oligomers to form other oligomers or polymers.

"Oligomer" refers to a compound that is a combination of 2 or more monomers, but that might not yet be large enough to qualify as a polymer.

"Polymer" refers to an organic molecule that has multiple carbon-containing monomer and/or oligomer units that are regularly or irregularly arranged. Polymer coatings made according to the present invention are prepared by linking together condensed monomers and/or oligomers so that at least a portion of the polymer coating's chemical structure has repeating units.

"Pre-polymer" includes monomers, oligomers, and mixtures or combinations thereof that are capable of being physically condensed on a surface and linked to form a polymer coating.

"Precursor coating" means a curable coating that, when cured, becomes a polymer coating.

"Profile-preserving coating" means a coating on a surface, where the outer profile of the coating substantially matches the profile of the underlying surface for feature dimensions greater than about 0.5 $\mu$m and smoothes the profile of the underlying surface for feature dimensions less than about 0.5 $\mu$m; where "substantially matching" includes surface profile deviations of no more than about 15%, that is, each dimension (such as length, width, and height) of the surface profile after coating deviates by no more than about 15% of the corresponding dimension before coating. For profile-preserving coatings that include multiple layer stacks, at least one layer of the multiple layer stack is a profile-preserving coating.

"Vapor", when used to modify the terms "monomer", "oligomer", or "pre-polymer", refers to monomer, oligomer, or pre-polymer molecules in the gas phase.

DETAILED DESCRIPTION

Figure 1:
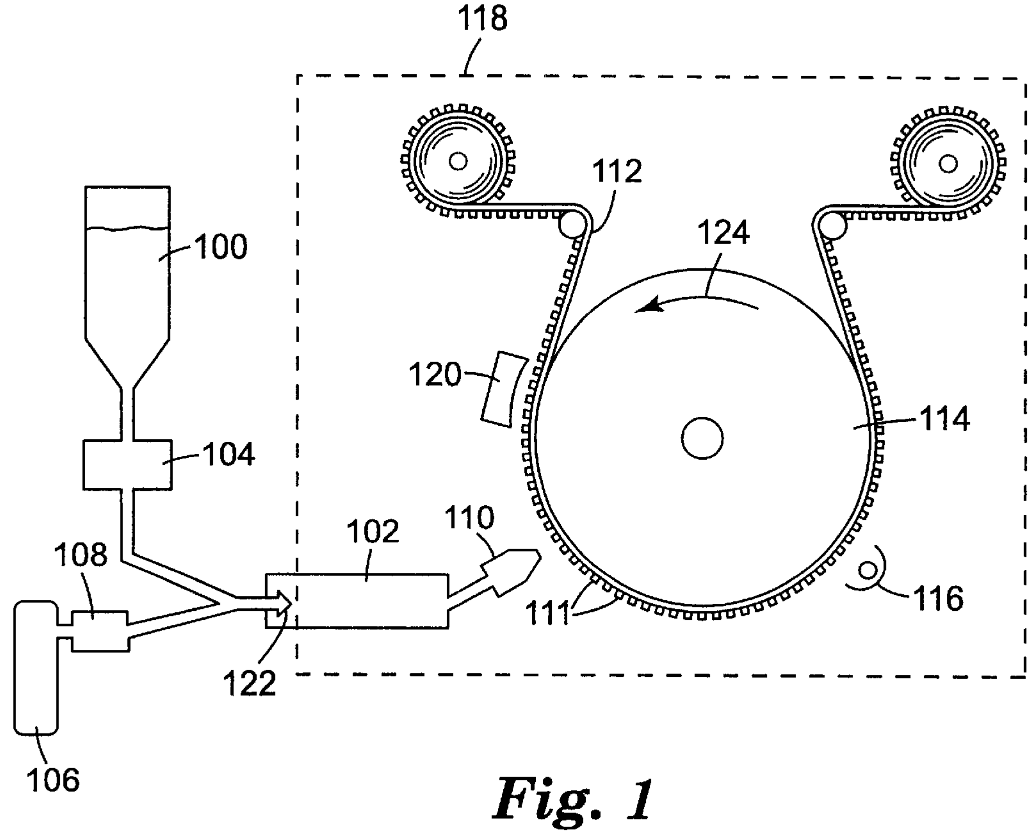
FIG. 1 is a schematic representation of a coating method useful in the present invention.

FIG. 1 shows a method of making a microstructured coated article. In general, a pre-polymer starting material can be vaporized, physically condensed onto a microstructured substrate, and cured to form a polymer coating on the microstructural elements of the substrate. As discussed in more detail throughout this document, the coating can be formed to preserve the profile of the microstructured substrate.

The coating process shown in FIG. 1 can be performed at atmospheric pressure, optionally enclosing the coating region in a chamber 118 (e.g., for providing a clean environment, for providing an inert atmosphere, or for other desired reagong), or at reduced pressure where chamber 118 is a vacuum chamber. Coating material 100, supplied in the form of a liquid monomer or pre-polymer, can be metered into evaporator 102 via pump 104. As described in detail below, the coating material can be evaporated by one of several techniques, including flash evaporation and carrier gas collision vaporization. Preferably, the coating material can be atomized into fine droplets through optional nozzle 122, the droplets being subsequently vaporized inside evaporator 102. Optionally, a carrier gas 106 can be used to atomize the coating material and direct the droplets through nozzle 122 into evaporator 102. Vaporization of the liquid coating material, or droplets of the liquid coating material, can be performed via contact with the heated walls of the evaporator 102, contact by the optional carrier gas 106 (optionally heated by heater 108), or contact with some other heated surface. Any suitable operation for vaporizing the liquid coating material is contemplated for use in this invention.

After vaporization, the coating material 100 can be directed through a coating die 110 and onto a microstructured surface 111 of substrate 112. A mask (not shown) can optionally be placed between the coating die 110 and the substrate 112 to coat selected portions of the substrate surface 111. For example, selected portions of the substrate can be coated to form characters, numeral, or other indicia on the substrate or to form areas on the substrate that have different characteristics, such as coloration. Optionally, the microstructured substrate surface 111 can be pretreated using an electrical discharge source 120, such as a glow discharge source, silent discharge source, corona discharge source, or the like. The pretreatment step is optionally performed to modify the surface chemistry, for example, to improve adhesion of coating material to the substrate, or for other such purposes.

Substrate 112 is preferably maintained at a temperature at or below the condensation temperature of the monomer or pre-polymer vapor exiting the coating die 110. Substrate 112 can be placed on, or otherwise disposed in temporary relation to, the surface of drum 114. The drum 114 allows the substrate 112 to be moved past the coating die 110 at a selected rate to control coating thickness. The drum 114 also can be maintained at a suitable bias temperature to maintain the substrate 112 at or below the pre-polymer vapor's condensation temperature.

After being applied on the microstructured substrate surface 111, the coating material can be solidified. For coating materials containing radiation-curable or heat-curable monomers, a curing source 116 can be provided downstream to the coating die 110 in the drum rotation direction (indicated by arrow 124). Any suitable curing source is contemplated by this invention, including electron beam sources, ultraviolet lamps, electrical discharge sources, heat lamps, ovens, dryers, and the like.

Apparatuses suitable for carrying out various aspects of the method illustrated in FIG. 1 are described in U.S. Pat Nos. 6,012,647 and 6,045,864 and in U.S. Pat. Nos. 4,722,515; 4,842,893; 4,954,371; 5,097,800; and 5,395,644. In particular, an apparatus that may be suitable for carrying out certain aspects of the method illustrated in FIG. 1 under vacuum conditions is commercially available on a custom-built basis from Delta V Technologies, Inc, Tucson, Ariz. Apparatuses and portions of apparatuses that may be suitable for carrying out these and other aspects of the method illustrated in FIG. 1 are described in more detail throughout this document.

Exemplary monomers and oligomers suitable for making profile-preserving polymer coatings are described in more detail in the discussion that follows. In brief, suitable monomers and oligomers include acrylates, methacrylates, acrylamides, methacrylamides, vinyl ethers, maleates, cinnamates, styrenes, olefins, vinyls, epoxides, silanes, melamines, hydroxy functional monomers, and amino functional monomers. Suitable monomers and oligomers can have more than one reactive group, and these reactive groups may be of different chemistries on the same molecule. Such mixed pre-polymers are typically used to give a broad range of physical, chemical, mechanical, biological, and optical properties in a final cured coating. It can also be useful to coat reactive materials from the vapor phase onto a substrate already having chemically reactive species on its surface, examples of such reactive species being monomers, oligomers, initiators, catalysts, water, or reactive groups such as hydroxy, carboxylic acid, isocyanate, acrylate, methacrylate, vinyl, epoxy, silyl, styryl, amino, melamines, and aldehydes. These reactions can be initiated thermally or by radiation curing, with initiators and catalysts as appropriate to the chemistry or, in some cases, without initiators or catalysts. When more than one pre-polymer starting material is used, the constituents may be vaporized and deposited together, or they can be vaporized from separate evaporation sources.

A preferred deposition method for producing a polymer coating on a microstructured surface according to the present invention includes the step of monomer vapor deposition. Monomer vapor deposition involves (1) vaporizing a monomer or other pre-polymer material, (2) condensing the material onto a microstructured substrate, and (3) curing the condensed material on the substrate. When condensed onto the substrate, the material is preferably in a liquid form, which can allow the coating to conform to and preserve the profile of the microstructured surface and to smooth substrate surface roughness that is smaller than the microstructural elements. Curing the liquid pre-polymer on the substrate hardens the material. Multiple layers of the same or different material can be repeatedly deposited and cured to form a series of coatings in a multilayer stack, where one or more of such layers can be a profile-preserving polymer coating that maintains the microstructured profile of the surface onto which it was deposited. Alternatively, other deposition techniques can be used to deposit other materials, such as metals or other inorganics (e.g., oxides, nitrides, sulfides, etc:), before or after depositing one or more polymer layers, or between separate polymer layers or multilayer stacks having one or more profile-preserving layer(s).

Vaporizing the coating material to form a monomer or pre-polymer vapor stream can be performed in a variety of ways, and any suitable process for vaporizing the pre-polymer coating material is contemplated by the present invention. Preferably, vaporizing the coating material results in molecules or clusters of molecules of the coating material that are too small to scatter visible light. Thus, preferably no visible scattering can be detected by the unaided eye when visible laser light is directed through the vaporized coating material. An exemplary method is flash evaporation where a liquid monomer of a radiation curable material is atomized into a heated chamber or tube in the form of small droplets that have diameters of less than a micron to tens of microns. The tube or chamber is hot enough to vaporize the droplets but not so hot as to crack or polymerize the monomer droplets upon contact. Examples of flash evaporation methods are described in U.S. Pat. Nos. 4,722,515; 4,696,719; 4,842,893; 4,954,371; 5,097,800; and 5,395,644, the disclosures of which are wholly incorporated by reference into this document.

Another preferred method for vaporizing the coating material to form a monomer or pre-polymer vapor stream is a carrier gas collision method as disclosed in U.S. Pat. No. 6,045,864. The carrier gas collision method described is based upon the concept of atomizing a fluid coating composition, which preferably is solvent-free, to form a plurality of fine liquid droplets. The fluid coating composition is atomized by directing the fluid composition through an expansion nozzle that uses a pressure differential to cause the fluid to rapidly expand and thereby form into small droplets. The atomized droplets are contacted with a carrier gas that causes the droplets to vaporize, even at temperatures well below the boiling point of the droplets. Vaporization can occur more quickly and more completely because the partial pressure of the vapor in admixture with the carrier gas is still well below the vapor's saturation pressure. When the gas is heated, it provides the thermal/mechanical energy for vaporization.

Atomization of the fluid coating composition can also be accomplished using other atomization techniques now known (or later developed) in the art, including ultrasonic atomization, spinning disk atomization, and the like. In a preferred embodiment, however, atomization is achieved by energetically colliding a carrier gas stream with a fluid composition stream. Preferably, the carrier gas is heated, and the fluid stream flow is laminar at the time of collision. The collision energy breaks the preferably laminar flow fluid coating composition into very fine droplets. Using this kind of collision to achieve atomization is particularly advantageous because it provides smaller atomized droplets that have a narrower size distribution and a more uniform number density of droplets per volume than can be achieved using other atomization techniques. Additionally, the resultant droplets are almost immediately in intimate contact with the carrier gas, resulting in rapid, efficient vaporization. The mixture of gas and vapor can be transported through a heated tube or chamber. Although polymer coatings on microstructured surfaces according to the present invention can be formed using coating operations in a vacuum, using carrier gas collision for atomization is less suitable for use in vacuum chambers because the carrier gas tends to increase the chamber pressure.

The tube or chamber can also include a vapor coating die that can serve to build pressure in the vaporization tube or chamber so that a steady, uniform monomer vapor stream flows from the vapor coating die. Monomer flow from a vapor coating die can be controlled by the rate of liquid monomer injection into the vaporization chamber, the aperture size at the end of the die, and the pathway length through the die. In addition, the vapor coating die aperture shape can determine the spatial distribution of the monomer vapor deposited on the substrate. For example, for a sheet-like flexible substrate mounted on the outside of a rotating drum, the vapor coating die aperture is preferably a slot oriented such that its long axis is aligned along the width of the substrate. The aperture also is preferably positioned such that each area along the width of the substrate where the coating is desired is exposed to the same vapor deposition rate. This arrangement gives a substantially uniform coating thickness distribution across the substrate.

The microstructured substrate is preferably maintained at a temperature at or below the condensation point of the vapor, and preferably well below the condensation point of the vapor. This causes the vapor to condense as a thin, uniform, substantially defect-free coating that can be subsequently cured, if desired, by various curing mechanisms.

The deposited pre-polymer materials can be applied in a substantially uniform, substantially continuous fashion, or they can be applied in a discontinuous manner, for example, as islands that cover only a selected portion or portions of the microstructured surface. Discontinuous applications can be provided in the form of characters or other indicia by using, for example, a mask or other suitable techniques, including subsequent removal of undesired portions.

Monomer vapor deposition is particularly useful for forming thin films having a thickness in a range from about 0.01 μm to about 50 μm. Thicker coatings can be formed by increasing the exposure time of the substrate to the vapor, by increasing the flow rate of the fluid composition to the atomizer, or by exposing the substrate to the coating material over multiple passes. Increasing the exposure time of the substrate to the vapor can be achieved by adding multiple vapor sources to the system or by decreasing the speed at which the substrate travels through the system. Layered coatings of different materials can be formed by sequential coating depositions using a different coating material with each deposition, or by simultaneously depositing materials from different sources displaced from each other along the substrate travel path.

The substrate is preferably attached to a mechanical means for moving the substrate past the evaporation source or sources so that the speed at which the substrate is moved past the source(s), and the rate at which the source(s) produce material, determines the thickness of the material deposited on a given area of the substrate. For example, flexible substrates can be mounted to the outside of a rotatable drum that is positioned near the pre-polymer vapor source(s) so that one revolution of the drum deposits one uniformly thick layer of material on the substrate for each vapor source.

The monomers or monomer mixtures employed preferably have vapor pressure between about $10^{-6}$ Torr and 10 Torr, more preferably approximately $10^{-3}$ to $10^{-1}$ Torr, at standard temperature and pressure. These high vapor pressure monomers can be flash vaporized, or vaporized by carrier gas collision methods, at relatively low temperatures and thus are not degraded via cracking by the heating process. The absence of unreactive degradation products means that films formed from these low molecular weight, high vapor pressure monomers have reduced levels of volatile components, and thereby a higher degree of chemical controllability. As a result, substantially all of the deposited monomer is reactive and can cure to form an integral film having controlled chemical composition when exposed to a source of radiation. These properties make it possible to provide a substantially continuous coating despite the fact that the deposited film is very thin (preferable thicknesses can vary depending on the end use of the coated article; however, exemplary thicknesses include those about 20% or less the size of the microstructural features on the substrate, those about 15% or less the size of the microstructural features, those about about 10% or less the size of the microstructural features, and so on).

After condensing the material on the substrate, the liquid monomer or pre-polymer layer can be cured. Curing the material generally involves irradiating the material on the substrate using visible light, ultraviolet radiation, electron beam radiation, ion radiation, and/or free radicals (as from a plasma), or heat or any other suitable technique. When the substrate is mounted on a rotatable drum, the radiation source preferably is located downstream from the monomer or pre-polymer vapor source so that the coating material can be continuously applied and cured on the surface. Multiple revolutions of the substrate then continuously deposit and cure monomer vapor onto layers that were deposited and cured during previous revolutions. This invention also contemplates that curing occur simultaneously with condensing, for example, when the substrate surface has a material that induces a curing reaction as the liquid monomer or pre-polymer material contacts the surface. Thus, although described as separate steps, condensing and curing can occur together, temporally or physically, under this invention.

The principles of this method can be practiced in a vacuum. Advantageously, however, atomization, vaporization, and coating can occur at any desired pressure or atmosphere, including ambient pressure and atmosphere. As another advantage, atomization, vaporization, and coating can occur at relatively low temperatures, so that temperature sensitive materials can be coated without degradation (such as cracking or polymerization of constituent molecules) that might otherwise occur at higher temperatures. This method is also extremely versatile in that virtually any liquid material, or combination of liquid materials, having a measurable vapor pressure can be used to form coatings.

To form polymeric coatings, the coating composition of the present invention can include one or more components that are monomeric, oligomeric, or polymeric, although typically only relatively low molecular weight polymers, e.g., polymers having a number average molecular weight of less than 10,000, preferably less than about 5000, and more preferably less than about 2000, would have sufficient vapor pressure to be vaporized in the practice of the present invention.

Representative examples of the at least one fluid component of the coating composition for forming polymer profile-preserving coatings on microstructured surfaces include: radiation curable monomers and oligomers that have carbon-carbon double bond functionality (of which alkenes, (meth) acrylates, (meth)acrylamides, styrenes, and allylether materials are representative); fluoropolyether monomers, oligomers, and polymers; fluorinated (meth)acrylates including poly(hexafluoropropylene oxide)diacrylate; waxes such as polyethylene and perfluorinated waxes; silicones including polydimethyl siloxanes and other substituted siloxanes; silane coupling agents such as amino propyl triethoxy silane and methacryloxypropyltrimethoxy silane; disilazanes such as hexamethyl disilazane; alcohols including butanediol or other glycols, and phenols; epoxies; isocyanates such as toluene diisocyanate; carboxylic acids and carboxylic acid derivatives such as esters of carboxylic acid and an alcohol, and anhydrides of carboxylic acids; aromatic compounds such as aromatic halides; phenols such as dibromophenol; phenyl ethers; quinones; polycyclic aromatic compounds including naphthalene, vinyl napthalene, and anthracene; nonaromatic heterocycles such as noborane; azlactones; aromoatic heterocycles such as furan, pyrrole, thiophene, azoles, pyridine, aniline, quinoline, isoquinoline, diazines, and pyrones; pyrylium salts; terpenes; steroids; alkaloids; amines; carbamates; ureas; azides; diazo compounds; diazonium salts; thiols; sulfides; sulfate esters; anhydrides; alkanes; alkyl halides; ethers; alkenes; alkynes; aldehydes; ketones; organometallic species such as titanates, zirconates, and aluminates; sulfonic acids; phosphine; phosphonium salts; phosphates; phosphonate esters; sulfur-stabilized carbanions; phosphorous stabilized carbanions; carbohydrates; amino acids; peptides; reaction products derived from these materials that are fluids having the requisite vapor pressure or can be converted (e.g., melted, dissolved, or the like) into a fluid having the requisite vapor pressure, combinations of these, and the like. Of these materials, any that are solids under ambient conditions, such as a paraffin wax, can be melted, or dissolved in another fluid component, in order to be processed using the principles of the present invention.

In the present invention, the coating composition can include at least one polymeric precursor component capable of forming a curable liquid coating on the microstructured substrate, wherein the component(s) have radiation or heat crosslinkable functionality such that the liquid coating is curable upon exposure to radiant curing energy in order to cure and solidify (i.e. polymerize and/or crosslink) the coating. Representative examples of radiant curing energy include electromagnetic energy (e.g., infrared energy, microwave energy, visible light, ultraviolet light, and the like), accelerated particles (e.g., electron beam energy), and/or energy from electrical discharges (e.g., coronas, plasmas, glow discharge, or silent discharge).

Radiation crosslinkable functionality refers to functional groups directly or indirectly pendant from a monomer, oligomer, or polymer backbone (as the case may be) that participate in crosslinking and/or polymerization reactions upon exposure to a suitable source of radiant curing energy. Such functionality generally includes not only groups that crosslink via a cationic mechanism upon radiation exposure but also groups that crosslink via a free radical mechanism. Representative examples of radiation crosslinkable groups suitable in the practice of the present invention include epoxy groups, (meth)acrylate groups, olefinic carbon-carbon double bonds, allylether groups, styrene groups, (meth) acrylamide groups, combinations of these, and the like.

Preferred free-radically curable monomers, oligomers, and/or polymers each include one or more free-radically polymerizable, carbon-carbon double bonds such that the average functionality of such materials is at least one free-radically polymerizable carbon-carbon double bond per molecule. Materials having such moieties are capable of copolymerization and/or crosslinking with each other via such carbon-carbon double bond functionality. Free-radically curable monomers suitable in the practice of the present invention are preferably selected from one or more mono-, di-, tri-, and tetrafunctional, free-radically curable monomers. Various amounts of the mono-, di-, tri-, and tetrafunctional, free-radically curable monomers may be incorporated into the present invention, depending upon the desired properties of the final coating. For example, in order to provide coatings that have higher levels of abrasion and impact resistance, it can be desirable for the composition to include one or more multifunctional free-radically curable monomers, preferably at least both di- and trifunctional free-radically curable monomers, such that the free-radically curable monomers incorporated into the composition have an average free-radically curable functionality per molecule of 1 or greater.

Preferred radiation curable coating compositions of the present invention can include 0 to 100 parts by weight of monofunctional free-radically curable monomers, 0 to 100 parts by weight of difunctional free-radically curable monomers, 0 to 100 parts by weight of trifunctional free-radically curable monomers, and 0 to 100 parts by weight of tetrafunctional free-radically curable monomers, subject to the proviso that the free-radically curable monomers have an average functionality of 1 or greater, preferably 1.1 to 4, more preferably 1.5 to 3.

One representative class of monofunctional free-radically curable monomers suitable in the practice of the present invention includes compounds in which a carbon-carbon double bond is directly or indirectly linked to an aromatic ring. Examples of such compounds include styrene, alkylated styrene, alkoxy styrene, halogenated styrenes, free-radically curable naphthalene, vinylnaphthalene, alkylated vinyl naphthalene, alkoxy vinyl naphthalene, acenaphthalene, combinations of these, and the like. Another representative class of monofunctional, free radially curable monomers includes compounds in which a carbon-carbon double bond is attached to an cycloaliphatic, heterocyclic, and/or aliphatic moiety such as 5-vinyl-2-norbornene, 4-vinyl pyridine, 2-vinyl pyridine, 1-vinyl-2-pyrrolidinone, 1-vinyl caprolactam, 1-vinylimidazole, N-vinyl formamide, and the like.

Another representative class of such monofunctional free-radically curable monomers include (meth)acrylate functional monomers that incorporate moieties of the formula:

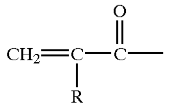

wherein R is a monovalent moiety, such as hydrogen, halogen, or an alkyl group. Representative examples of monomers incorporating such moieties include (meth) acrylamides, chloro(meth)acrylamide, linear, branched, or cycloaliphatic esters of (meth)acrylic acid containing from 1 to 16, preferably 1 to 8, carbon atoms, such as methyl (meth)acrylate, n-butyl (meth)acrylate, t-butyl (meth) acrylate, ethyl (meth)acrylate, isopropyl (meth)acrylate, 2-ethylhexyl (meth)acrylate, and isooctylacrylate; vinyl esters of alkanoic acids that may be linear, branched, or cyclic; isobornyl (meth)acrylate; vinyl acetate; allyl (meth) acrylate, and the like.

Such (meth)acrylate functional monomers may also include other kinds of functionality such as hydroxyl functionality, nitrile functionality, epoxy functionality, carboxylic functionality, thiol functionality, amine functionality, isocyanate functionality, sulfonyl functionality, perfluoro functionality, bromo functionality, sulfonamido, phenyl functionality, combinations of these, and the like. Representative examples of such free-radically curable compounds include glycidyl (meth)acrylate, (meth) acrylonitrile, β-cyanoethyl-(meth)acrylate, 2-cyanoethoxyethyl (meth)acrylate, p-cyanostyrene, thiophenyl (meth)acrylate, (tetrabromocarbazoyl) butyl (meth)acrylate, ethoxylated bromobisphenol A di(meth) acrylate, bromobisphenol A diallyl ether, (bromo) phenoxyethyl acrylate, butylbromophenylacrylate, p-(cyanomethyl)styrene, an ester of an α,β-unsaturated carboxylic acid with a diol, e.g., 2-hydroxyethyl (meth) acrylate, or 2-hydroxypropyl (meth)acrylate; 1,3-dihydroxypropyl-2-(meth)acrylate; 2,3-dihydroxypropyl-1-(meth)acrylate; an adduct of an α,β-unsaturated carboxylic acid with caprolactone; an alkanol vinyl ether such as 2-hydroxyethyl vinyl ether; 4-vinylbenzyl alcohol; allyl alcohol; p-methylol styrene, N,N-dimethylamino (meth) acrylate, (meth)acrylic acid, maleic acid, maleic anhydride, trifluoroethyl (meth)acrylate, tetrafluoropropyl (meth) acrylate, hexafluorobutyl (meth)acrylate, 2-(N-ethylperfluorooctanesulfonamido) ethyl acrylate, ethylperfluorooctanesulfonamido) ethyl (meth)acrylate, 2-(N-butylperfluorooctanesulfonamido) ethyl acrylate, butylperfluorooctylsulfonamido ethyl (meth)acrylate, ethylperfluorooctylsulfonamidoethyl (meth)acrylate, pentadecafluorooctylacrylate, mixtures thereof, and the like.

Another class of monofunctional free-radically curable monomers suitable in the practice of the present invention includes one or more N,N-disubstituted (meth)acrylamides. Use of an N,N-disubstituted (meth)acrylamide may provide some advantages. For example, the monomer may allow antistatic coatings to be produced which show improved adhesion to polycarbonate substrates. Further, use of this kind of monomer may provide coatings that have improved weatherability and toughness. Preferably, the N,N-disubstituted (meth)acrylamide has a molecular weight of about 99 to about 500.

The N,N-disubstituted (meth)acrylamide monomers generally have the formula:

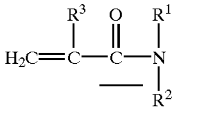

wherein $R^1$ and $R^2$ are each independently hydrogen, a $(C_1–C_8)$alkyl group (linear, branched, or cyclic) optionally having hydroxy, halide, carbonyl, and amido functionalities, a $(C_1–C_8)$alkylene group optionally having carbonyl and amido functionalities, a $(C_1–C_4)$alkoxymethyl group, a $(C_4–C_{10})$aryl group, a $(C_1–C_3)$alk$(C_4–C_{10})$aryl group, or a $(C_4–C_{10})$heteroaryl group; with the proviso that only one of $R^1$ and $R^2$ is hydrogen; and $R^3$ is hydrogen, a halogen, or a methyl group. Preferably, $R^1$ is a $(C_1–C_4)$alkyl group; $R^2$ is a $(C_1–C_4)$alkyl group; and $R^3$ is hydrogen, or a methyl group. $R^1$ and $R^2$ can be the same or different. More preferably, each of $R^1$ and $R^2$ is $CH_3$, and $R^3$ is hydrogen.

Examples of such suitable (meth)acrylamides are N-tert-butylacrylamide, N,N-dimethylacrylamide, N,N-diethylacrylamide, N-(5,5-dimethylhexyl)acrylamide, N-(1,1-dimethyl-3-oxobutyl)acrylamide, N-(hydroxymethyl) acrylamide, N-(isobutoxymethyl)acrylamide, N-isopropylacrylamide, N-methylacrylamide, N-ethylacrylamide, N-methyl-N-ethylacrylamide, and N,N'-methylene-bis acrylamide. A preferred (meth)acrylamide is N,N-dimethyl (meth)acrylamide.

Other examples of free-radically curable monomers include alkenes such as ethene, 1-propene, 1-butene, 2-butene (cis or trans) compounds including an allyloxy moiety, and the like.

In addition to, or as an alternative to, the monofunctional free-radically curable monomer, any kind of multifunctional free-radically curable monomers preferably having di-, tri-, and/or tetra- free-radically curable functionality also can be used in the present invention. Such multifunctional (meth) acrylate compounds are commercially available from a number of different suppliers. Alternatively, such compounds can be prepared using a variety of well known reaction schemes.

Specific examples of suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexanediol, 1,2-cyclohexanediol, 1,6-cyclohexanedimethanol; hexafluorodecanediol, octafluorohexanediol, perfluoropolyetherdiol, the triacrylic acid and trimethacrylic acid esters of aliphatic triols such as glycerin, 1,2,3-propanetrimethanol, 1,2,4-butanetriol, 1,2,5-pentanetriol, 1,3,6-hexanetriol, and 1,5,10-decanetriol; the triacrylic acid and trimethacrylic acid esters of tris (hydroxyethyl) isocyanurate; the tetraacrylic and tetramethacrylic acid esters of aliphatic triols, such as 1,2,3,4-butanetetrol, 1,1,2,2,-tetramethylolethane, and 1,1,3,3-tetramethylolpropane; the diacrylic acid and dimethacrylic acid esters of aromatic diols such as pyrocatechol, and bisphenol A; mixtures thereof; and the like.

Figure 2:
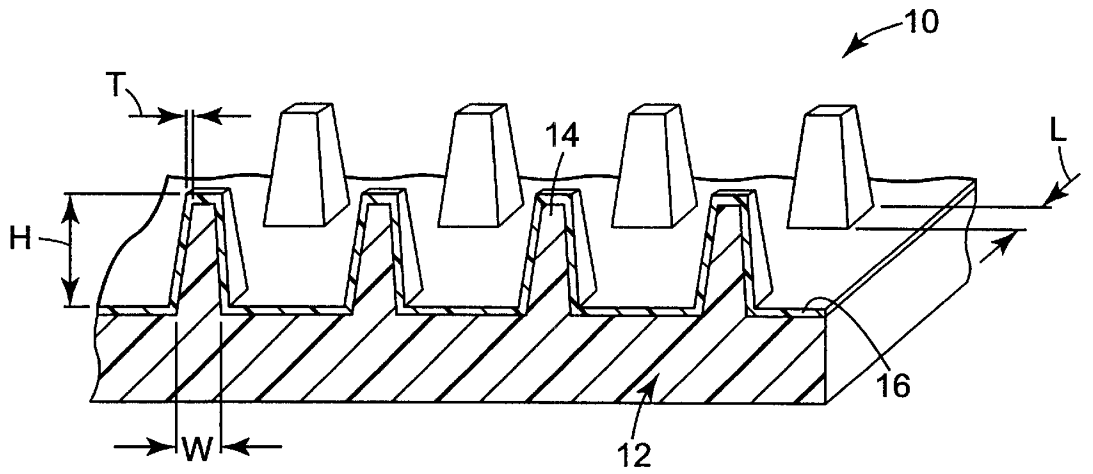
FIG. 2 is a schematic representation of an article 10 that includes a microstructured substrate 12 that has a profile-preserving coating 16 in accordance with the present invention.

The inventive method of coating microstructured substrates can be used to form profile-preserving polymer coatings. The drawings illustrate the concept of a profile-preserving coating on a microstructured article. FIG. 2 in particular shows an article 10 that includes a substrate 12 that has a plurality of microstructural elements 14. The microstructural elements 14 can be, for example, post-like features that can be characterized by a height, H, and by dimensions of the base, denoted width, W, and length, L. These structures can also taper from base to top, as shown in FIG. 2.

Substrate 12 has a coating 16 disposed thereon that conforms to the microstructured profile. The thickness, T, of coating 16 is thin enough to make the coating a profile-preserving coating. What it is to be "thin enough to make a profile-preserving coating" depends on the application and the dimensions of the microstructural elements. For example, in FIG. 2, when the thickness of the coating is on the order of half the distance between microstructural elements, the coating may fill in the structure of the surface and cease to be profile-preserving. In practice, the upper limit on coating thickness to achieve profile-preserving coatings is smaller than the smallest characteristic dimension of interest of the microstructural elements on the surface. For example, in FIG. 2, the upper limit on the coating thickness is less than the width, W, of the base of the microstructural elements, and preferably is less than about 50%, more preferably less than about 20%, the width of the base of the microstructural elements. The term "smallest characteristic dimension of interest" varies in meaning depending on the microstructured features. For microstructured features having relatively flat surface facets, however, the smallest characteristic dimension of interest is often measured by the smallest of those flat surface facets. For rounded microstructured features, a dimension such as a diameter or a radius of curvature may be a more appropriate measure.

To preserve the profile of the microstructured surface, the polymer coating of the present invention has a thickness that is preferably no more than about 20% of the smallest characteristic dimension of interest of the microstructural elements. Depending on the microstructured feature dimensions, the polymer coating has a thickness that is preferably less than 200 μm, more preferably less than 100 μm, and even more preferably less than 50 μm. In addition, the polymer coating preferably has a thickness that is greater than about 0.01 μm. In this way, the coating can fill in surface features that are much smaller than the size of the microstructured features, thereby smoothing the surface while preserving the microstructured profile.

A microstructured surface including features similar to those shown in FIG. 2 can be used for many applications. Examples include microstructured fasteners (as disclosed in U.S. Pat. Nos. 5,634,245 and 5,344,177), spacers like those used for electronic display substrates such as a liquid crystal display panels (for example, the microstructured ridges and posts disclosed in U.S. Pat. No. 5,268,782), light extraction structures on an optical waveguide (like those disclosed in European Patent Application EP 0 878 720 A1), and other applications as will be apparent to skilled artisans. For such applications, the width and length of the base of the microstructural elements in FIG. 2 can be about 0.5 μm to hundreds of micrometers in size. Similarly, the heights of the microstructural elements can vary from tenths of microns to hundreds of microns. The microstructural elements might or might not be uniformly sized and spaced on the substrate surface. The spacing between microstructural elements can range from under 1 μm to about 1000 μm.

Figure 3:
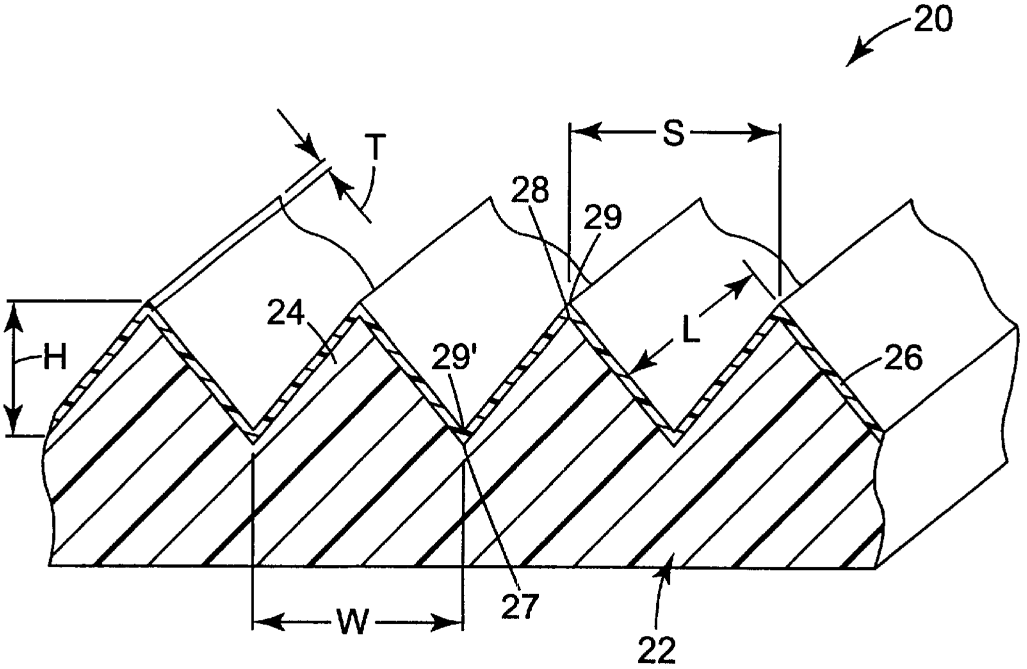
FIG. 3 is a schematic representation of an article 20 that includes a microstructured substrate 22 that has a profile-preserving coating 26 in accordance with the present invention.

FIG. 3 shows microstructured article 20 that includes a substrate 22 that has a series of V-shaped parallel grooves defined by microstructured features 24. The features have a peak-to-peak spacing, S, a valley-to-valley width, W, a peak-to-valley height, H, a side surface length, L, and an angle formed at each peak and valley by adjacent side surface facets. Profile-preserving coating 26 has a thickness, T. One feature than can be of interest on a microstructured surface as shown in FIG. 3 is the sharpness of the angles at peaks 28 and valleys 27. Sharpness of an angle can be measured by a radius of curvature. Radius of curvature indicates the radius of the largest sphere that could fit inside the concave portion of the angle while maximizing the surface area contacted by the sphere. Microstructured V-grooves can have radii of curvature of tens of micrometers down to tens of nanometers. When coating 26 is deposited, the sharpness of the peaks and valleys is preferably substantially preserved. Depending on the thickness of coating 26, however, some rounding can occur at the peak of the coating 29 and at the valley of the coating 29'. Rounding at the peaks is typically less significant than rounding at the valleys. More significant rounding at the valleys can occur due to a meniscus formed by a liquid monomer coating to reduce surface tension during deposition. The amount of rounding can depend on the thickness of the coating, the angle of the V-grooved structures, the material of the coating, and the overall size of the structures.

A microstructured surface that has features similar to V-grooves as shown in FIG. 3 can be used for various purposes, which include managing the angularity of light output as for light tubes (as disclosed in U.S. Pat. No. 4,805,984) or display screens, controlling fluid flow, increasing surface area for catalysis applications, and other functions as apparent to skilled artisans. Additionally, microstructured surfaces can be made having pyramid-like or cube-corner protrusions or indentations, which can be visualized in terms of multiple sets of intersecting V-grooves. Pyramidal and cube-cornered microstructured surfaces can be useful, for example, as retroreflective sheeting (as disclosed in U.S. Pat. Nos. 5,450,235; 5,614,286; and 5,691,846), as optical security articles (as disclosed in U.S. Pat. No. 5,743,981), as diffraction gratings such as for holograms (as disclosed in U.S. Pat. No. 4,856,857), as microstructured abrasive articles (as disclosed in U.S. Pat. No. 5,672,097), or in other such applications.

Figure 4:
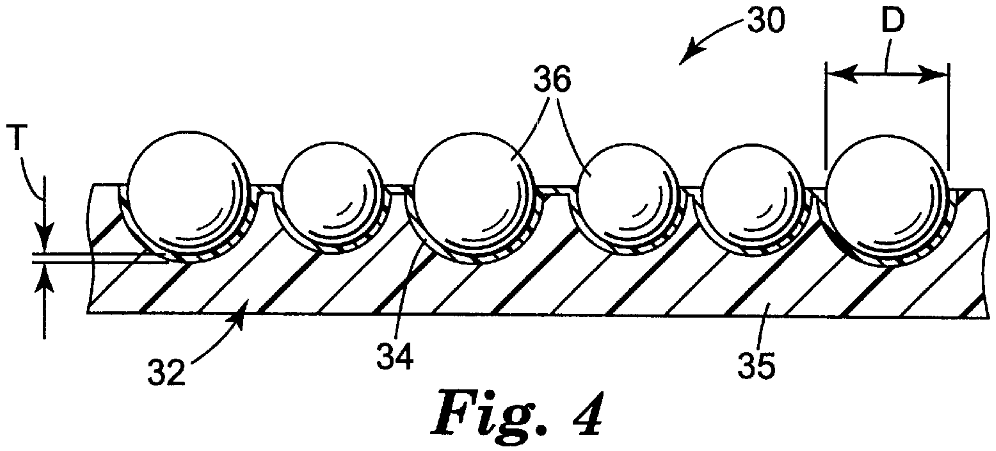
FIG. 4 is a schematic representation of an article 30 that includes a microstructured substrate 32 that has a profile-preserving coating 34 in accordance with the present invention.

FIG. 4 shows a microstructured article 30, which may be a retroreflective sheeting such as disclosed in U.S. Pat. Nos. 3,700,478; 3,700,305; 4,648,932; and 4,763,985. Article 30 includes a substrate 32 that has a layer of optical elements such as microspheres 36 disposed thereon. The microspheres 36 have a profile-preserving coating 34 and are partially embedded in a backing 35 (also commonly referred to as a binder layer). The thickness, T, of coating 34 is much smaller than the diameter, D, of the microspheres 36 so that the coating substantially preserves the curved profile of the spheres 36. Coating 34 can be applied to microspheres 36 when the spheres are on a carrier film (not shown), with the backing subsequently applied over the coating on the spheres. The carrier film is then removed to give the construction shown in FIG. 4.

As described in the above-noted patents and in PCT Publication WO00/50931, the construction of FIG. 4 can be useful, for example, as retroreflective sheeting for road signs or other such applications. For retroreflective applications, the coating behind the microspheres should be highly reflective. While metal coatings or multilayer metal-oxide dielectric coatings can be applied as reflective coatings on the microspheres, these types of coatings can corrode over time and lose their reflectivity. As described in further detail in the illustrative examples below, the present invention can be used to provide a multilayer polymer coating behind the microspheres to preserve the profile of the microsphere structure and to also provide a surface highly reflective to light, particularly visible light.

Microstructured substrates that have profile-preserving polymer coatings can be used for a variety of purposes. For instance, as illustrated in the following examples, a layer of microspheres can be coated with a profile-preserving polymer layer to act as a space coat between the microspheres and a reflective layer for enclosed lens retroreflective beaded sheeting such as described in U.S. Pat. Nos. 4,763,985 and 4,648,932. Analogously, a profile-preserving polymer coating can be used as an intermediate layer disposed on a layer of microspheres or as a reflective layer in retroreflective sheeting. For example, a profile-preserving coating can be used to replace the intermediate layer or the reflective layer (or both) disclosed in U.S. Pat. No. 5,812,317. Profile-preserving polymer coatings can also be used in multilayer stacks to form reflective coatings on microstructured articles as disclosed in PCT Publication WO00/50931.

EXAMPLES

Advantages and objects of this invention are further illustrated in the Examples set forth hereafter. It is to be understood, however, that while the Examples serve this purpose, the particular ingredients and amounts used and other conditions recited in the Examples are not to be construed in a manner that would unduly limit the scope of this invention. The Examples selected for disclosure are merely illustrative of how to make various embodiments of the invention and how the embodiments generally perform.

Example 1

In this example, an article was produced that was constructed similar to the article 30 shown in FIG. 4. In producing this article, a temporary carrier sheet was provided that had a monolayer of glass microspheres (average diameter of about 60 μm and refractive index of 2.26) partially and temporarily embedded in the surface of a polyvinyl butyral resin crosslinked through its hydroxyl groups to a substantially thermoset state. The polyvinyl butyral resin was supported by a plasticized polyvinyl chloride coating on a paper carrier liner. This microstructured sheet of base material was referred to as wide-angle-flat-top (WAFT) beadcoat.

A sample of WAFT beadcoat was taped to a chilled steel drum of a monomer vapor deposition apparatus such as described in U.S. Pat. No. 4,842,893. The apparatus used a flash evaporation process to create a pre-polymer vapor that was coated using a vapor coating die. The vapor coating die directed the coating material onto the WAFT beadcoat. The WAFT beadcoat was mounted on a drum that rotated to expose the substrate to, in order, a plasma treater, the vapor coating die, and an electron beam curing head. The deposition took place in a vacuum chamber. The vapor coating die was designed to coat about a 30.5 centimeters (cm) width of a substrate mounted on the drum. The microstructured WAFT beadcoat material was 30.5 cm wide and was aligned with the vapor coating die to coat at least 28 cm of the substrate width plus a narrow band on the metal drum about 2.5 cm wide. Tripropylene glycol diacrylate was evaporated and condensed onto the microstructured WAFT beadcoat sample while maintaining the chilled steel drum at −30° C. The sample on the drum was moved past the plasma treater, vapor coating die, and electron beam curing head at a speed of 38 meters per minute (m/min). A nitrogen gas flow of 570 milliliters per minute (ml/min) was applied to the 2000 Watt plasma treater. The room temperature tripropylene glycol diacrylate liquid flow was 9 ml/min. The monomer evaporator stack was maintained at 290° C. The vapor coating die was maintained at 275° C. The vacuum chamber pressure was $4.8\times10^{-4}$ Torr. The electron beam curing gun used an accelerating voltage of 10 kV and 9 to 12 milliamps current.

The monomer, tripropylene glycol diacrylate, was applied and cured during 20 revolutions of the sample, with approximately 0.5 μm of the monomer deposited and cured at each revolution (approximately 10 μm total thickness after 20 revolutions). To estimate the coating thickness on the microstructured WAFT beadcoat sample, the polytripropylene glycol diacrylate that was coated and cured onto the narrow band of exposed smooth metal drum was removed and measured to have a 10.5 μm thickness. The coating thickness on the microstructured WAFT beadcoat was estimated from photomicrographs to be approximately 10 μm.

As described below, the microspheres were subsequently coated with an aluminum reflector layer and a pressure sensitive adhesive layer, and then removed from the temporary carrier to produce an article like that shown in FIG. 4.

Example 2

Another piece of microstructured WAFT beadcoat, as described in Example 1, was taped to the chilled steel drum of the apparatus used in Example 1. For the monomer, a 50/50 by weight mixture of tris(2-hydroxyethyl) isocyanurate triacrylate and trimethylolpropane triacrylate was used at the same conditions given in Example 1, except that this mixture of monomers was heated to 80° C., the plasma power was at 1900 Watts and the chamber vacuum was at $4.5\times10^{-4}$ Torr. The deposited polymer thickness was estimated at approximately 6 μm. This is thinner than for Example 1, which used a lower molecular weight monomer as compared to the mixture of higher molecular weight monomers used in Example 2.

Figure 5:
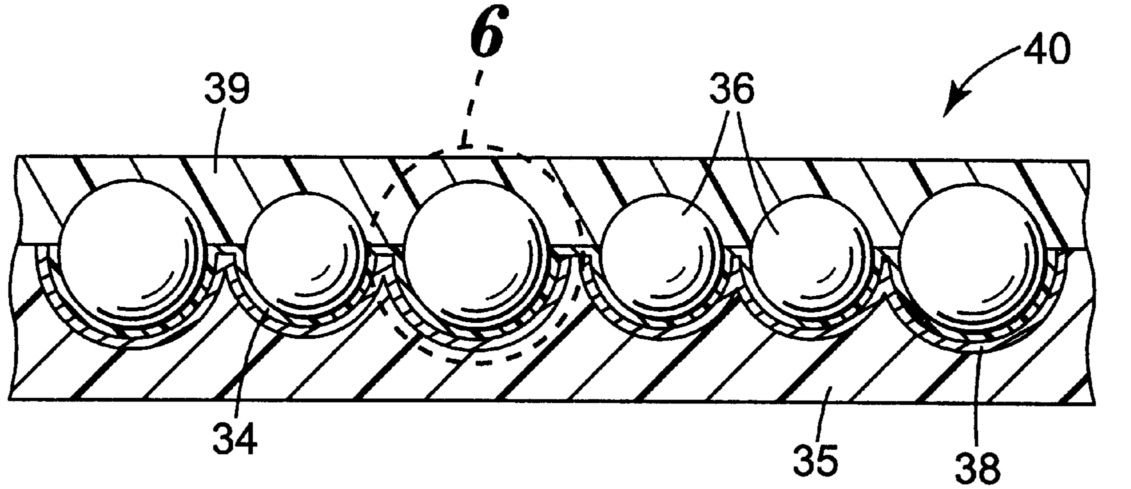
FIG. 5 is a cross-sectional view of a portion of a retroreflective article 40 that has a profile-preserving coating 34 in accordance with the present invention.
Figure 6:
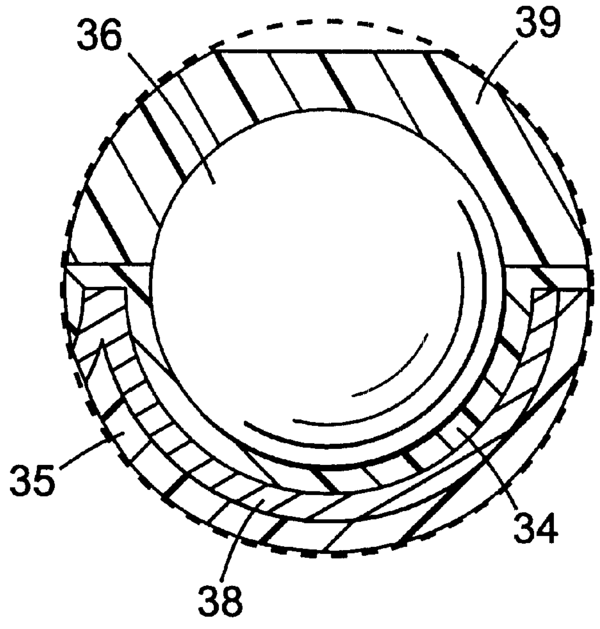
FIG. 6 is a magnified view of a portion of the retroreflective article as indicated by region 6 in FIG. 5.

Aluminum metal was deposited in a bell jar vapor coater over the polymer coatings made in Examples 1 and 2 to form metal reflective layers that completed the optics for the enclosed-lens retroreflective sheeting. After applying the aluminum coating, a layer of pressure sensitive adhesive was laminated on the coated microspheres, and the temporary carrier sheet was removed from the microspheres. At this point, a protective overcoat can optionally be applied on the portions of the microspheres exposed by removal of the temporary carrier to form an article 40 as shown in FIG. 5. As indicated in FIG. 5, enclosed-lens retroreflective sheeting 40 can include a layer of microspheres 36 embedded in a binder layer 35, with polymer coating 34 (such as that deposited in Examples 1 and 2) disposed on the microspheres and a reflective coating 38 (such as aluminum or other reflective metals) disposed between the polymer coating and the binder layer. In some applications, polymer coating 34 acts as a space coat, which compensates for light refraction caused by protective overcoat 39. FIG. 6 shows a magnified view of region 6 as indicated in FIG. 5. As demonstrated in the magnified view, coating 34, as deposited in Examples 1 and 2, can be a profile-preserving coating.

For comparison with Examples 1 and 2, a sheet of retroreflective sheeting was used as commercially available from Minnesota Mining and Manufacturing Co. (3M), St. Paul, Minn. under the trade designation 3M SCOTCHLITE Flexible Reflective Sheeting #580-10. Retroreflective performance was measured for Examples 1 and 2 and the comparative example by measuring the intensity of light retroreflected off each sample after incidence at a chosen entrance angle according to standardized test ASTM E 810. The results are reported in Table I.

Retroreflected light is that light reflected back toward the source of the light and offset by a small observation angle to account for a difference in position of the light source and the observer's eyes. The observation angle was kept constant at 0.2° for these measurements. The entrance angle is the angle between the light rays incident on the surface and the line perpendicular to the surface at the point of incidence. The entrance angle was as set forth in Table I. The ability of a retroreflective sheeting to retroreflect light over a range of entrance angles is generally referred to as the angularity of the reflective sheeting. For WAFT sheeting to have good angularity, the polymer coating (or space coat) and the metal Al coating (or other reflector coat) should preserve the curved profile of the microspheres.

TABLE I

Retroreflectivity at Different Entrance Angles
(candlepower/foot candle/square foot = candela/lux/square meter)

| | Entrance Angle | | |
|---|---|---|---|
| Example | −4° or 5° | 40° | 50° |
| 1 | 136.6 | 45.4 | 15.3 |
| 2 | 41.7 | 15.8 | 5.6 |
| comparative | 103.5 | 31.3 | 12.4 |

As seen from Table I, Example 1 had excellent brightness and angularity comparable to the commercially-available sample. Example 2 displayed fair performance, but measured somewhat lower than Example 1 and the commercially-available comparative sample, which utilizes solvent-based processes to provide it with a space coat. Based on knowledge of solvent-borne space coats, it is believed that Example 2 had a lower space coat thickness than desired for good brightness, whereas Example 1 was closer to the optimal space coat thickness of about 12 μm for 60 μm diameter microspheres.

Example 3

Glass microspheres having an average diameter of 40 to 90 μm and a refractive index of 1.93 were partially embedded into a temporary carrier sheet, forming a microstructured substrate referred to as a beadcoat carrier. The beadcoat carrier was taped onto the chilled steel drum of the monomer vapor coating apparatus described in Example 1. Alternating layers of sec-butyl(dibromophenyl acrylate) (SBBPA), as described in U.S. Pat. No. 5,932,626, and tripropylene glycol diacrylate (TRPGDA) were evaporated and condensed onto the beadcoat carrier while the chilled steel drum was maintained at −30° C. The drum rotated to move the sample past the plasma treater, vapor coating die, and electron beam curing head at a speed of 38 m/min. A nitrogen gas flow of 570 ml/min was applied to the 2000 Watt plasma treater. The room "Retroreflective Articles Having Polymer Multilayer Reflective Coatings"). temperature tripropylene glycol diacrylate liquid flow was 1.2 ml/min, and the heated SBBPA liquid flow was 1.1 ml/min. The monomer evaporator stack was maintained at 295° C., and the vapor coating die was 285° C. The vacuum chamber pressure was $2.2\times10^{-4}$ Torr. The electron beam curing gun used an accelerating voltage of 7.5 kV and 6 milliamps current. The alternating layers were applied by opening the SBBPA monomer flow valve at the monomer pump for one drum revolution then closing the SBBPA monomer flow valve and simultaneously opening the TRPGDA monomer flow valve for the next revolution. This was repeated for 60 alternating layers, each layer being cured before the next layer was deposited. The beadcoat carrier coated with the 60 alternating layers was coated with about 0.7 mm of a rapid-curing, general purpose epoxy adhesive as sold by ITW Devcon, Danvers, Mass., under the trade designation POLYSTRATE 5-MINUTE EPOXY. The epoxy was allowed to cure at ambient conditions for 1 hour before stripping away the beadcoat carrier to expose portions of the microspheres on the surface.

For comparison, glass microspheres were embedded into a beadcoat carrier and coated with about 0.7 mm of the same epoxy without vapor depositing layers onto the microspheres. The carrier film was stripped away after curing the epoxy for 1 hour. The retroreflectance of Example 3 and this comparative example were measured as a function of wavelength for visible light having wavelengths of 400 nm to 800 nm. Example 3 had about a 2.5% to 3.5% reflectance throughout the range of wavelengths whereas the comparative sample without the multilayer coating on the microspheres had about a 1.5% reflectance throughout the range. This indicated that the multilayer vapor coating was reflective.

Example 4

Glass microspheres having an average diameter of 40 to 90 μm and a refractive index of 1.93 were partially embedded into a temporary carrier sheet. The temporary carrier sheet is referred to as a vaporcoat carrier. Aluminum pecular reflective layers were applied to the exposed portions of the microspheres to yield retroreflective elements. The metalized vaporcoat carrier/microsphere layer was coated via notch-bar coating, using a 0.15 mm gap, and with an emulsion of the following components (given in parts by weight):

39.42 parts Rhoplex HA-8 (Rohm and Haas Co.)
2.06 parts Acrysol ASE-60 (Rohm and Haas Co.)
0.23 parts Nopco DF 160-L (Diamond Shamrock Co.) diluted 50% with water
0.47 parts ammonium nitrate (diluted with water, 10.6 parts water, 90.4 parts ammonium nitrate)
0.31 parts ammonium hydroxide (aqueous 28–30% wt/wt)
1.96 parts Z-6040 (Dow Chemical Co.)
2 parts Aerotex M-3 (American Cyanamid Co.)
55.55 parts water The material was cured for about 5 minutes in a 105° C. oven. A film of corona-treated ethylene-acrylic acid copolymer less than 0.1 mm thick (commercially available from Consolidated Thermoplastics Co., Dallas, Tex., under the trade designation LEA-90) was laminated to the coated, metalized vaporcoat carrier. The vaporcoat carrier was then stripped away to expose the microspheres on the substrate surface.

The exposed glass-microsphere microstructured substrate was coated by monomer vapor deposition at atmospheric pressure in a roll-to-roll coating system by the method and apparatus described in U.S. Pat. Nos. 6,012,647 and 6,045,864. A liquid stream was atomized, vaporized, condensed, and polymerized onto the exposed microspheres of the microstructured substrate. This occurred as follows. A liquid stream, composed of a solution of 7.08 parts by weight 1,6-hexanediol diacrylate having a boiling point of 295° C. at standard pressure, and 60.0 parts by weight perfluorooctylacrylate (commercially available from 3M Company, St. Paul, Minn. under the trade designation FC 5165), having a boiling point of 100° C. at 100 mm Hg (1400 Pa), was conveyed with a syringe pump (commercially available from Harvard Apparatus, Holliston, Mass., under the trade designation Model 55-2222) through an atomizing nozzle such as that disclosed in International Applications US 98/24230 (corresponding to U.S. patent application Ser. No. 08/980,947) and U.S. patent application Ser. No. 98/22953 (corresponding to U.S. patent application Ser. No. 08/980, 948). A gas stream (cryogenic-grade nitrogen, available from Praxair Co., Inver Grove Heights, Minn.) at 0.35 mPa (34 psi) was heated to 152° C. and passed through the atomizing nozzle. The liquid flow rate was 0.5 ml/min and the gas stream flow rate was 26.1 liters per minute (l/min) (standard temperature and pressure, or "STP"). Both the liquid stream and the gas stream passed through the nozzle along separate channels as described in U.S. Pat. Nos. 6,012,647 and 6,045,864. The gas stream exited an annular orifice directed at a central apex located 3.2 mm from the end of the nozzle. At that location, the gas stream collided with the central liquid stream. The liquid stream was thereby atomized to form a mist of liquid droplets in the gas stream. The atomized liquid droplets in the gas stream then vaporized quickly as the flow moved through a vapor transport chamber. The vapor transport chamber had two parts, a glass pipe that had a 10 cm diameter and a 64 cm length and an aluminum pipe that had a 10 cm diameter and a 10 cm length. The exit end of the nozzle extended approximately 16 mm into one end of the glass pipe and the aluminum pipe was joined to the other end of the glass pipe. The glass and aluminum pipes were heated using heating tape and band heater wrapped around the outside of the pipe to prevent vapor condensation on the vapor transport chamber walls.

The vapor and gas mixture exited the vapor coating die at the end of the aluminum pipe. The outlet of the vapor coating die was a slot that had a 25 cm length and a 1.6 mm width. The temperature of the vapor and gas mixture was 120° C. at a position 3 cm before the outlet of the vapor coating die. The substrate was conveyed past the vapor coating die on a chilled metal drum via a mechanical drive system that controlled the rate of motion of the substrate film at 2.0 m/min. The gap between the vapor coating die and cooled drum was 1.75 mm. The vapor in the gas and vapor mixture condensed onto the film, forming a strip of wet coating.

Immediately after coating, while the substrate was still on the chilled drum, the monomer coating was free-radically polymerized by passing the coated film under a 222 nm monochromatic ultraviolet lamp system (commercially available from Heraeus Co., Germany, under the trade designation Nobelight Excimer Labor System 222) in a nitrogen atmosphere. The lamp had an irradiance of 100 $mW/cm^2$.

Example 5

The substrate and coating processes were carried out according to Example 4 except the substrate speed during monomer vapor deposition was 4.0 m/min and the inlet gas temperature was 146° C.

Example 6

The substrate and coating processes were carried out according to Example 4 except that prior to monomer vapor deposition, the substrate was nitrogen-corona treated at a normalized corona energy of 1.3 $J/cm^2$ with 300 Watt power and 54 l/min nitrogen flow past the electrodes. Three ceramic-tube electrodes from Sherman Treaters, Ltd., UK, that had an active length of 35 cm were used with a bare metal ground roll. The corona power supply was a model RS-48B Surface Treater from ENI Power Systems, Rochester, N.Y. The speed during the sequential steps of corona treatment, monomer vapor deposition, and curing was 4.0 m/min and the inlet gas temperature was 140° C.

Retroreflectivity of Examples 4 through 6 and an Al-coated control sample were measured as described for Example 1. The results are reported in Table II. As can be seen from Table II, Examples 4 through 6 have improved retroreflectivity relative to the Al-coated control sample, especially for higher entrance angles.

TABLE II

Retroreflectivity at Different Entrance Angles (Candlepower/foot candle/square foot = Candela/lux/square meter)

| Example | Entrance Angle −4° | Entrance Angle 50° |
|---|---|---|
| control | 575 | 127 |
| 4 | 592 | 129 |
| 5 | 603 | 145 |
| 6 | 601 | 153 |

Example 7

A piece of optical film commercially available from Minnesota Mining and Manufacturing Co., St. Paul, Minn. under the trade designation 3M OPTICAL LIGHTING FILM (OLF) #2301 was taped to the chilled steel drum of the monomer vapor deposition apparatus and monomer vapor coated as in Example 1. OLF has a series of micro-structured V-shaped grooves and peaks on one side and is smooth on the other. The film is typically used in electronic displays to manage light distribution. The V-shaped structures were about 178 μm high with a 356 μm peak-to-peak spacing. The "V" angle was 90° at the peaks and at the valleys. Tripropylene glycol diacrylate was evaporated and condensed onto the grooved side of the OLF sample with the chilled steel drum maintained at −30° C. The sample on the drum was moved past the plasma treater, vapor coating die, and electron beam curing head at a speed of 38 meters per minute. A nitrogen gas flow of 570 ml/min was applied to the 2000 Watt plasma treater. The room temperature tripropylene glycol diacrylate liquid flow was 9 ml/min. The monomer evaporator stack was maintained at 290° C. and the vapor coating die was 275° C. The vacuum chamber pressure was $4.8\times10^{-4}$ Torr. The electron beam curing gun used an accelerating voltage of 10 kV and 9 to 12 milliamps current. The monomer, tripropylene glycol diacrylate, was applied and cured during 20 revolutions of the sample, with approximately 0.5 μm deposited on the drum during each revolution. A total thickness of 1 μm, however, was measured on the OLF. The difference between the thickness on the drum (10 μm) and the OLF (1 μm) was probably due to poor heat transfer between the OLF sample and the drum, resulting in less cooling of the OLF sample in relation to the drum.

Figure 7:
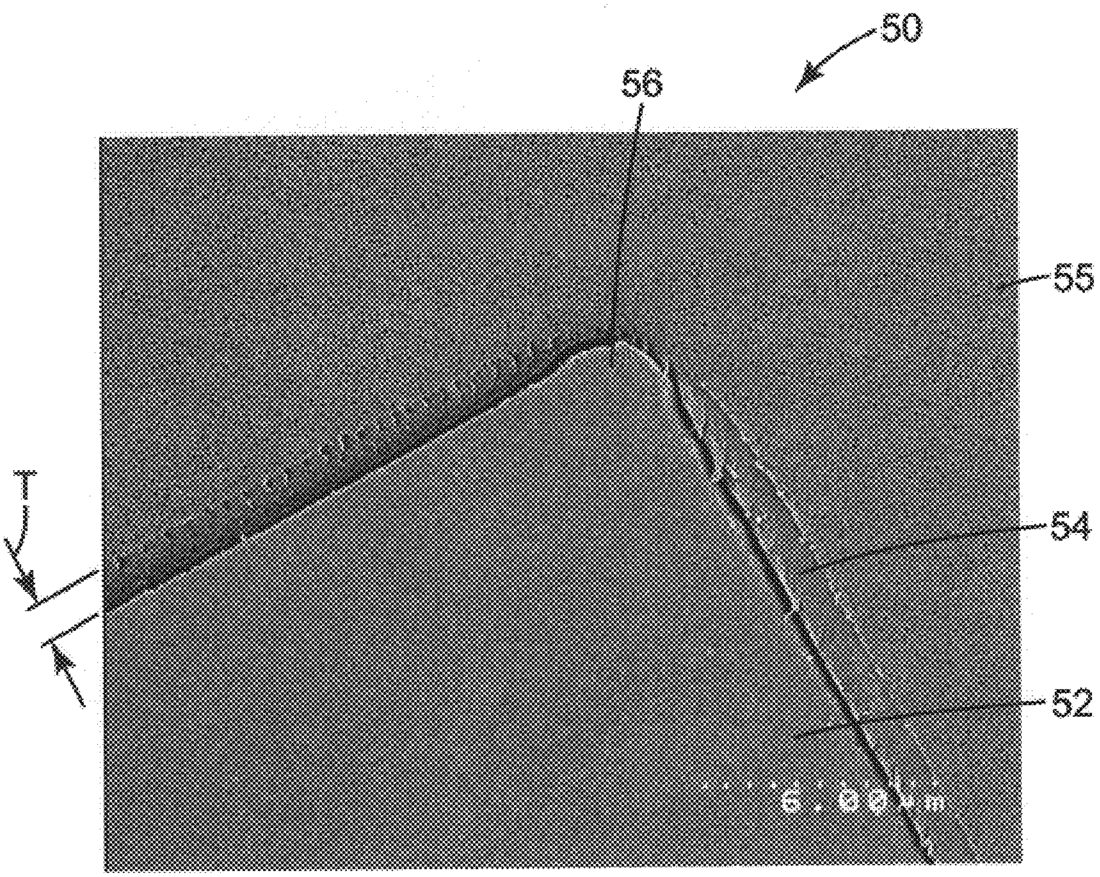
FIG. 7 is a digital reproduction of a scanning electron micrograph showing a portion of a coated microstructured substrate 52 in cross-section in accordance with the present invention.

FIG. 7 shows a digitally reproduced scanning electron micrograph of a portion of the coated OLF sample 50 near a peak 56. The image was magnified to show about the upper 10% of a single feature on the OLF substrate. The OLF substrate 52 had a profile-preserving coating 54, and was imaged after being encased in an epoxy 55 that was cured around the sample and then cross-sectioned using a microtome. The epoxy-encased cross-section was polished and imaged to give the micrograph shown in FIG. 7. As indicated by the 6 μm scale in FIG. 7, the thickness T of coating 54 was about 1 μm. The coating had a smaller thickness in an area around peak 56, but the overall profile of the coated OLF sample matched the underlying OLF profile to within 3%. The dark band between OLF substrate 52 and coating 54 indicated partial delamination of the coating during the polishing step.

Example 8

A sheet of OLF as used in Example 7 was conveyed through the apparatus described in Example 1 in a roll-to-roll set up at a speed of 38 meters per minute. Tripropylene glycol diacrylate was evaporated and condensed onto the grooved side of the OLF sample with the chilled steel drum at −30° C. The OLF web was moved past the plasma treater, vapor coating die, and electron beam curing head at a speed of 38 meters per minute. A nitrogen gas flow of 570 ml/min was applied to the 2000 Watt plasma treater. The room temperature tripropylene glycol diacrylate liquid flow was 18 ml/min. The monomer evaporator stack was 290° C. and the vapor coating die was 275° C. The chamber vacuum was held at $4.8\times10^{-4}$ Torr. The electron beam curing gun used an accelerating voltage of 12 to 15 kV and 9 to 12 milliamps current. Under these conditions, approximately a 0.6 μm thick layer of polytripropylene glycol diacrylate was deposited over the microstructured side of the OLF sample.

Figure 8:
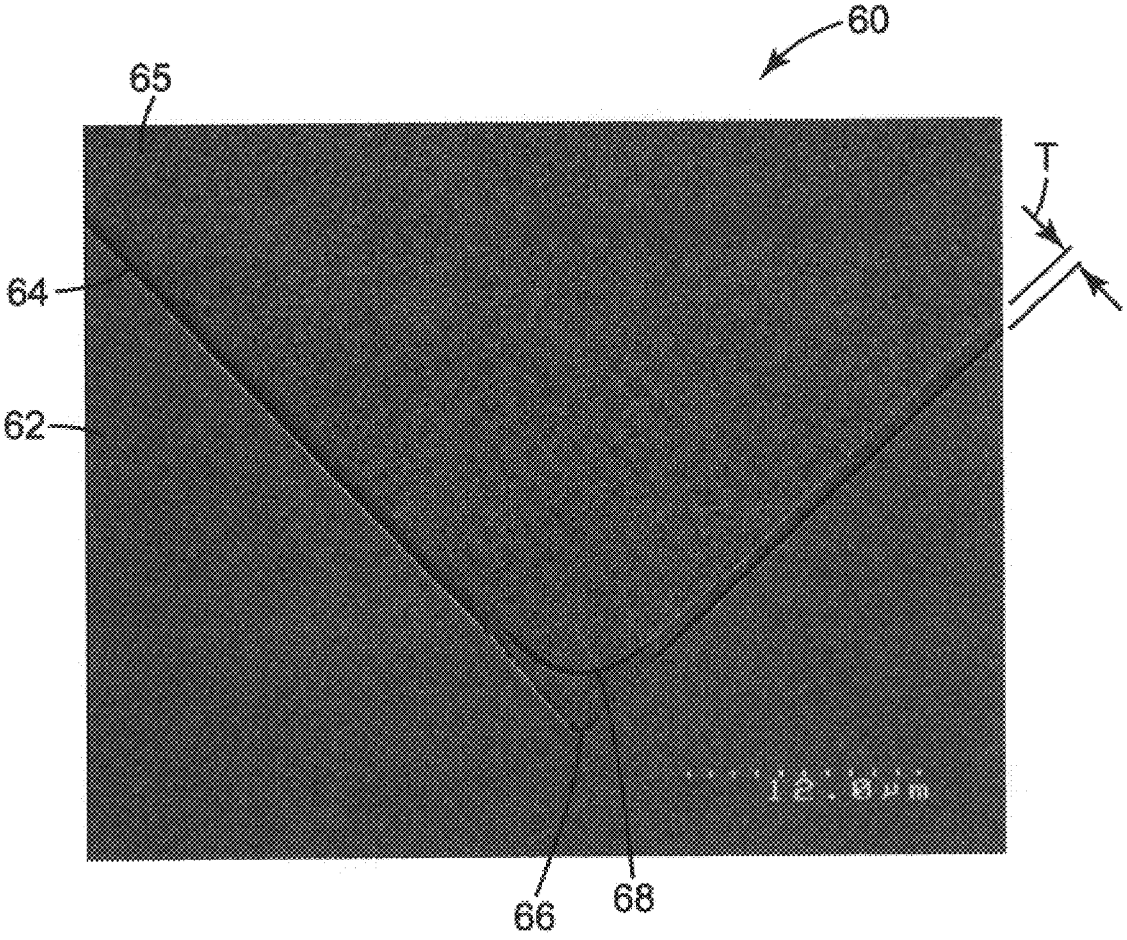
FIG. 8 is a digital reproduction of a scanning electron micrograph showing a portion of a coated microstructured substrate 62 in cross-section in accordance with the present invention.

FIG. 8 shows a digitally reproduced scanning electron micrograph of a portion of the coated OLF sample 60 near a valley 66. The image was magnified to show about the lower 20% of the intersection of two features on the OLF substrate 62 at a valley 66. The OLF substrate 62 had a profile-preserving coating 64, and was imaged after being encased in an epoxy 65 that was cured around the sample and then cross-sectioned using a microtome. The epoxy-encased cross-section was polished and imaged to give the micrograph shown in FIG. 8. As indicated by the 12 $\mu$m scale in FIG. 8, the thickness T of coating 64 was about 0.6 $\mu$m. The coating had a rounded portion 68 adjacent to valley 66 of OLF substrate 62. The curvature of the rounded portion of the coating was larger than the curvature of the valley, but the overall profile of the coated OLF sample matched the underlying OLF profile to within 1% of the facet lengths. The dark bands between OLF substrate 62 and coating 64, and between coating 62 and epoxy 65 indicated partial delamination of the coating during the polishing step.

Surface roughness of Examples 7 and 8 and of uncoated OLF were analyzed by interferometry. Interferometry measures the heights of surfaces features by splitting a laser beam into a sample beam and a reference beam, reflecting the sample beam off the surface of the sample, and detecting the phase difference between the reference beam (which traverses a known distance) and the sample beam. The distance that the reference beam traverses is varied through a predetermined range so that multiple constructive and destructive interference fringes are detected. In this way, differences in surface heights can be detected. The samples were tilted 45° so that the interferometer was looking directly at one of the sides of the V-grooves. As reported in Table III, $R_q$ and $R_a$ are statistical measures of the surface roughness, with higher values indicating higher roughness. $R_q$ is the root mean square roughness and is calculated by taking the square root of the sum of the squares of the difference between the height at a given point on the surface and the average height of the surface. $R_a$ is the average height deviation across the surface. Table III summarizes the results.

TABLE III

| | Surface Roughness in Nanometers (nm) | | |
|---|---|---|---|
| Example | coating thickness | $R_q$ | $R_a$ |
| control | uncoated | 23.54 nm | 18.36 nm |
| 7 | 1 $\mu$m | 21.73 nm | 15.83 nm |
| 8 | 0.6 $\mu$m | 13.17 nm | 10.54 nm |

The data in Table III show that the coated OLF surfaces in Examples 7 and 8 were smoother (had lower $R_q$ and $R_a$ values) than the OLF surface prior to coating. This indicates that the coatings in Examples 7 and 8, while preserving the profile of the OLF sample microstructure, also smoothed the facets of the microstructure.

All of the patents and patent applications cited above are incorporated into this document in total as if reproduced in full.

This invention may be suitably practiced in the absence of any element not specifically described in this document.

Various modifications and alterations of this invention will be apparent to one skilled in the art from the description herein without departing from the scope and spirit of this invention. Accordingly, the invention is to be defined by the limitations in the claims and any equivalents thereto.

What is claimed is:

1. A method of making a microstructured coated article, which method comprises the steps of:

providing a substrate having a microstructured surface;

condensing a pre-polymer vapor onto the microstructured surface to form a curable precursor coating that is contiguous over a plurality of adjacent microstructures; and curing the precursor coating disposed on the microstructured surface.

2. The method of claim 1, further comprising the step of vaporizing a liquid composition containing a monomer or an oligomer to form the pre-polymer vapor.

3. The method of claim 2, wherein the step of vaporizing comprises flash evaporating a liquid monomer or a liquid oligomer.

4. The method of claim 2, wherein the step of vaporizing comprises using a carrier gas collision method.

5. The method of claim 2, wherein the step of vaporizing a liquid composition is carried out by atomizing the liquid composition into droplets and then vaporizing the droplets.

6. The method of claim 1, wherein the steps of condensing and curing are performed under vacuum.

7. The method of claim 1, wherein the steps of condensing and curing are performed in an inert atmosphere.

8. The method of claim 1, wherein only selected areas of the microstructured surface are exposed to the pre-polymer vapor.

9. The method of claim 8, wherein the selected areas form characters, numerals, or other indicia.

10. The method of claim 8, wherein the selected areas have a different coloration than other areas of the microstructured surface.

11. The method of claim 1, wherein the step of curing comprises exposing the precursor coating to radiation.

12. The method of claim 1, wherein the step of curing comprises heating the precursor coating.

13. The method of claim 1, wherein the step of curing occurs simultaneously with the step of condensing.

14. The method of claim 1, wherein the condensing and curing steps are performed multiple times in an alternating fashion to form a multilayer coating on the microstructured surface.

15. The method of claim 1, wherein the pre-polymer vapor contains acrylates, methacrylates, acrylamides, methacrylamides, vinyl ethers, maleates, cinnamates, styrenes, olefins, vinyls, epoxides, silanes, melamines, hydroxy functional monomers or oligomers, or amino functional monomers or oligomers.

16. The method of claim 1, where in the microstructured surface comprises a layer of microspheres.

17. The method of claim 1, wherein the microstructured surface comprises a plurality of pyramidal protrusions.

18. The method of claim 1, wherein the microstructured surface comprises a plurality of V-shaped grooves.

19. The method of claim 1, wherein the step of curing the precursor coating forms a profile-preserving polymer coating on the microstructured surface.

* * * * *